(12) United States Patent
Aizawa

(10) Patent No.: US 9,916,166 B2
(45) Date of Patent: Mar. 13, 2018

(54) POWER SUPPLY CONTROL FOR A PROCESSING DEVICE, ARRAY-TYPE PROCESSING DEVICE, AND INFORMATION PROCESSING SYSTEM, AND CONTROL METHOD THEREOF

(71) Applicant: CANON KABUSHIKI KAISHA, Tokyo (JP)

(72) Inventor: Eiji Aizawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 358 days.

(21) Appl. No.: 14/178,479

(22) Filed: Feb. 12, 2014

(65) Prior Publication Data

US 2014/0237227 A1    Aug. 21, 2014

(30) Foreign Application Priority Data

Feb. 15, 2013  (JP) ................................. 2013-028344

(51) Int. Cl.
*G06F 1/32* (2006.01)
*G06F 9/44* (2018.01)
(Continued)

(52) U.S. Cl.
CPC .......... *G06F 9/4411* (2013.01); *G06F 1/3287* (2013.01); *G06F 9/442* (2013.01);
(Continued)

(58) Field of Classification Search
CPC ....... G06F 1/3287; G06F 9/442; G06F 9/5094
See application file for complete search history.

(56) References Cited

U.S. PATENT DOCUMENTS 7,659,746 B2 * 2/2010 Chua-Eoan ........... G06F 1/3203
326/62
7,861,101 B2 12/2010 Houshaku
(Continued)

FOREIGN PATENT DOCUMENTS

| JP | 2006163815 A | 6/2006 |
|---|---|---|
| JP | 2008097463 A | 4/2008 |
| JP | 2010244238 A | 10/2010 |

OTHER PUBLICATIONS

Office Action issued in Japanese Application No. JP2013028344, dated Aug. 29, 2016.
(Continued)

*Primary Examiner* — Jaweed A Abbaszadeh
*Assistant Examiner* — Gary Collins
(74) *Attorney, Agent, or Firm* — Rossi, Kimms & McDowell LLP

(57) ABSTRACT

This invention provides an array-type processing device which can reduce power consumption and can also reduce a processing performance drop caused by switching of configuration information. An array-type processing device, which includes a first domain and a second domain, the device comprises a plurality of processing units which are allocated in the first domain, and each of which includes a plurality of processing elements and a router configured to control connections between the plurality of processing elements, a configuration information supply unit configured to supply configuration information to one or more processing units of the plurality of processing units, the configuration information supply unit being allocated in the second domain, and a power supply control unit configured to control the power supply to the plurality of processing units, the power supply control unit being allocated in the second domain.

16 Claims, 13 Drawing Sheets

(51) Int. Cl.
  *G06F 9/50* (2006.01)
  *G06F 15/173* (2006.01)
  *G06F 15/78* (2006.01)

(52) U.S. Cl.
  CPC ...... *G06F 9/5094* (2013.01); *G06F 15/17381* (2013.01); *G06F 15/7867* (2013.01); *Y02B 60/1282* (2013.01); *Y02B 60/142* (2013.01)

(56) References Cited

U.S. PATENT DOCUMENTS

| | | | | |
|---|---|---|---|---|
| 2003/0056127 | A1* | 3/2003 | Vaglica | G06F 1/3243 713/300 |
| 2004/0257898 | A1* | 12/2004 | Ozawa | G06F 1/3203 365/213 |
| 2005/0218952 | A1* | 10/2005 | Padhye | G11C 5/147 327/218 |
| 2006/0156045 | A1* | 7/2006 | Galles | G06F 1/3203 713/300 |
| 2008/0034235 | A1* | 2/2008 | Houshaku | G06F 1/3287 713/320 |
| 2009/0106569 | A1* | 4/2009 | Roh | G06F 1/3203 713/300 |
| 2009/0167093 | A1* | 7/2009 | Nguyen | G06F 1/28 307/80 |
| 2009/0293061 | A1* | 11/2009 | Schwinn | G06F 9/3851 718/103 |
| 2012/0185703 | A1* | 7/2012 | Machnicki | G06F 1/3203 713/300 |
| 2014/0006817 | A1* | 1/2014 | Bonen | G06F 1/3243 713/320 |
| 2014/0298068 | A1* | 10/2014 | Kosonocky | G06F 1/3287 713/324 |

OTHER PUBLICATIONS

Decision to Grant a Patent issued in Japanese Appln. No. 2013-028344 dated Jan. 13, 2017. English machine translation provided.

* cited by examiner

| Config_en | CURRENT Write_Pointer | NEXT Write_Pointer |
|---|---|---|
| 0 | – | – |
| 1 | 00 | 01 |
| 1 | 01 | 10 |
| 1 | 10 | 00 |

400b

| Valid | Write_Pointer | ASSERTION TARGET |
|---|---|---|
| 0 | XXX | NONE |
| 1 | 00 | 209 |
| 1 | 01 | 210 |
| 1 | 10 | 211 |

400c

| Config_en | SWITCHING INSTRUCTION | CURRENT Config_Count | NEXT Config_Count |
|---|---|---|---|
| 1 | 0 | 00 | 01 |
| 1 | 0 | 01 | 10 |
| 1 | 0 | 10 | 11 |
| 0 | 1 | 01 | 00 |
| 0 | 1 | 10 | 01 |
| 0 | 1 | 11 | 10 |

400d

| SWITCHING INSTRUCTION | CURRENT Read_Pointer | NEXT Read_Pointer |
|---|---|---|
| 0 | – | – |
| 1 | 00 | 01 |
| 1 | 01 | 10 |
| 1 | 10 | 00 |

FIG. 6

|  | DOMAIN A | DOMAIN B | DOMAIN C | DOMAIN D |
|---|---|---|---|---|
| 601 CONFIGURATION INFORMATION 1 | ○ | ○ | ○ | — |
| 602 CONFIGURATION INFORMATION 2 | ○ | — | ○ | — |
| 603 CONFIGURATION INFORMATION 3 | ○ | ○ | ○ | ○ |
| 604 CONFIGURATION INFORMATION 4 | — | — | — | ○ |
| 605 CONFIGURATION INFORMATION 5 | — | ○ | ○ | ○ |

POWER SUPPLY CONTROL FOR A PROCESSING DEVICE, ARRAY-TYPE PROCESSING DEVICE, AND INFORMATION PROCESSING SYSTEM, AND CONTROL METHOD THEREOF

BACKGROUND OF THE INVENTION

Field of the Invention

The present invention relates to a power control technique in an array-type processing device which includes a plurality of processing elements and can execute a plurality of different processes.

Description of the Related Art

Along with element miniaturization due to the advance of semiconductor manufacturing technologies, a scale of an LSI (Large-Scale Integrated circuit) is further increased, and the number of transistors to be mounted is exponentially increased. Then, an LSI which can cope with multiple applications by a single chip is demanded. High performance, low power consumption, and function change flexibility are especially required for an LSI so as to cope with a variety of products.

In recent years, in order to meet requirements such as high performance, low power consumption, and function change flexibility, an array-type processing device as a dynamically reconfigurable processor has received a lot of attention. The array-type processing device is mainly configured by processing elements (to be referred to as PEs hereinafter) such as a CPU, DSP, and ALU, and a router required to control inter-PE connections. Setting data called configuration information is set in the PEs and router to change the processing contents of the PEs and connections of the router. That is, by dynamically changing the configuration information according to the data processing contents, the array-type processing device can flexibly cope with function changes, and high performance can be easily attained by increasing the number of PEs.

However, by increasing the number of PEs mounted on the array-type processing device, processing performance can be improved, but power consumption is unwantedly increased at the same time. Hence, a technique for allocating a domain where ON/OFF of a power supply can be switched (power shut off domain) in the array-type processing device, and reducing power consumption by shutting off the power supply to that domain is known. Also, Japanese Patent Laid-Open No. 2010-244238 (parent literature 1) discloses a technique for suspending/resuming an operation of a processing device array. More specifically, patent literature 1 discloses a technique which uses a buffer circuit which temporarily stores externally supplied data when an operation of a reconfigurable processing device array is suspended, and supplies the stored data to the reconfigurable processing device array when the operation is resumed.

However, when the power shut off domain is allocated in the array-type processing device, if power supply to a configuration information transfer bus as a transfer path of configuration information is shut off, the configuration information cannot be written. For this reason, upon rewriting the configuration information, power supply to the configuration information transfer bus is required, and power supply has to be made even to domains which do not include any PEs associated with processes to be executed. The technique described in patent literature 1 above merely suspends/resumes the operation of the processing device array, and cannot solve this problem. Furthermore, a time period required to rewrite configuration information is prolonged as the number of PEs is increased. When the configuration information is switched frequently, a time period of a performance drop caused by a long rewrite time period of the configuration information after the power supply is resumed is not negligible.

SUMMARY OF THE INVENTION

According to an aspect of the present invention, an array-type processing device, which includes a first domain, a power supply to which is controllable, and a second domain to which the power supply is always supplied, the device comprises: a plurality of processing units which are allocated in the first domain, and each of which includes a plurality of processing elements and a router configured to control connections between the plurality of processing elements; a configuration information supply unit configured to supply configuration information to one or more processing units of the plurality of processing units, the configuration information supply unit being allocated in the second domain; and a power supply control unit configured to control the power supply to the plurality of processing units, the power supply control unit being allocated in the second domain, wherein the configuration information supply unit comprises: a holding unit configured to externally receive configuration information and to hold the configuration information; a selection unit configured to select one configuration information from pieces of configuration information held by the holding unit; and a supply unit configured to supply the configuration information selected by the selection unit to one or more processing units which use the configuration information, and when processing in the array-type processing device is switched from processing using first configuration information to processing using second configuration information, the holding unit externally receives and holds the second configuration information before completion of the processing using the first configuration information, the power supply control unit controls the power supply so as to stably supply the power supply to one or more processing units used by the second configuration information before completion of the processing using the first configuration information, and the selection unit selects the second configuration information in response to completion of the processing using the first configuration information.

According to another aspect of the present invention, a processing device comprises: a plurality of processing elements to which processes according to setting data are configured to be assigned; a connection element configured to provide a connection environment according to the setting data to the plurality of processing elements; a supply unit configured to detect completion of processing according to first setting data in the plurality of processing elements, and to supply second setting data to the processing elements and the connection element in response to detection; and a control unit configured to control a power supply voltage to be supplied to a processing unit including the plurality of processing elements and the connection element, and to a controller including the supply unit.

According to still another aspect of the present invention, a processing device, which includes a plurality of first domains, a power supply to which is controllable, and a second domain to which the power supply is always supplied, the device comprises: a plurality of processing units which are allocated in the first domain, and each of which includes a plurality of processing elements and a router configured to control connections between the plurality of processing elements; a supply unit configured to supply configuration information to the processing device, the supply unit being allocated in the second domain; and a power supply control unit configured to control the power supply to the processing device, the power supply control unit being allocated in the second domain.

According to the present invention, a processing performance drop due to switching of the configuration information is reduced while reducing power consumption in the processing device.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 exemplarily shows various tables used by the supply unit;

FIG. 6 is a table showing PSO domains used in processes using respective pieces of configuration information;

DESCRIPTION OF THE EMBODIMENTS

Preferred embodiments of the present invention will be described in detail hereinafter with reference to the drawings. Note that the following embodiments are presented only for the exemplary purpose, and do not limit the scope of the present invention.

First Embodiment

An array-type processing device which dynamically changes PEs to be used will be exemplified below as the first embodiment of an array-type processing device according to the present invention. Especially, an arrangement which can suitably rewrite configuration information (rewrite from first setting data to second setting data) even when a PSO (Power Shut Off) domain is allocated in the array-type processing device will be explained.

<Arrangement of Array-Type Processing Device>

Figure 1:
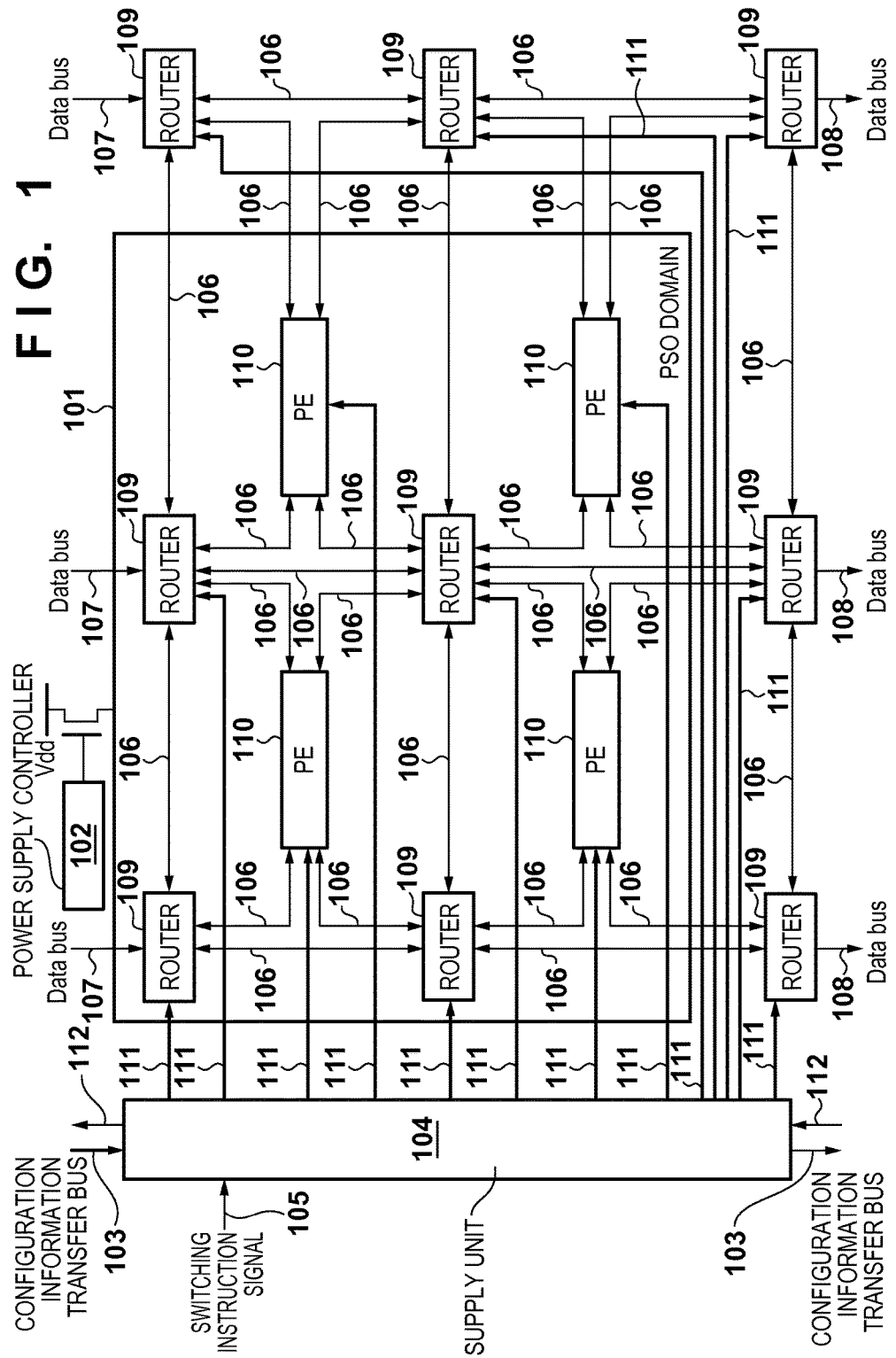
FIG. 1 is a block diagram showing the internal arrangement of an array-type processing device according to the first embodiment.

FIG. 1 is a block diagram showing the internal arrangement of the array-type processing device according to the first embodiment. The array-type processing device is configured by a PSO domain (first domain) 101 which is configured to shut off power supply, and a domain (second domain) to which power supply is always supplied. The PSO domain 101 is a domain as a power supply ON/OFF switching control target. In the PSO domain 101, routers 109, PEs 110, and network signal lines 106 (to be described later) are allocated. Note that elements which are not allocated in the PSO domain 101 are allocated in the domain to which power supply is always supplied.

A power supply controller 102 (power supply control unit) controls ON/OFF switching of power supply to the PSO domain 101. A configuration information transfer bus 103 is a bus which transfers two signals, that is, a Valid signal and configuration information signal. Configuration information is serially transferred using the configuration information signal, and configuration information transfer control is attained using the Valid signal and a Busy signal (to be described later). When an effective value is set in the configuration information signal, the Valid signal is asserted in synchronism with the configuration information signal. Note that as the power supply control, a power supply voltage may be configured to be controlled in addition to power supply/shut off control.

A Busy signal 112 is a signal output when a configuration information supply unit 104 (to be described later) cannot receive configuration information, and is used in configuration information transfer control. While the Busy signal 112 is asserted, the system continuously outputs the same configuration information onto the configuration information transfer bus 103, or does not transmit any configuration information until the Busy signal 112 is deasserted. In the description of this embodiment, the bus configured by the Valid signal, Busy signal, and configuration information signal is used to transfer configuration information. However, the bus structure is not limited to this, and various other bus structures can be used.

The configuration information supply unit 104 (to be referred to as a supply unit 104 hereinafter) supplies configuration information required for processing to each router (connection element) and PE. The supply unit 104 holds a plurality of pieces of configuration information received from the configuration information transfer bus 103, and executes switching control of configuration information to be output to each PE or a network signal which connects between PEs when a trigger signal (to be described later) is asserted.

A switching instruction signal 105 is a signal which serves as a trigger of a switching instruction of configuration information. More specifically, upon detection of a processing end timing, the system asserts the switching instruction signal 105. When the switching instruction signal 105 is asserted, the supply unit 104 switches configuration information to be output. In the description of this embodiment, the switching instruction signal 105 is asserted at the processing end timing. However, the present invention is not limited to the processing end timing, and the switching instruction signal 105 may be asserted at another timing as long as that timing is before the beginning of the next processing.

Network signal lines 106 are those which are interconnected to allow data transmission/reception between different routers and between each router and PE. Data required for processing is input via each input data bus 107. Data which has undergone transfer control by each router 109 is output via a corresponding output data bus 108. Each router 109 determines a data transfer path of the network signal lines 106, input data bus 107, and output data bus 108 according to configuration information output from the supply unit 104. Each PE 110 is an element used to execute data processing, and is configured by a processing element (PE) such as an ALU, CPU, or DSP, and changes its processing contents according to configuration information which is output from the supply unit 104 and is written.

The supply unit 104 transfers configuration information to the routers 109 or PEs 110 via signal lines 111. Note that each router 109 and PE 110 are connected to a predetermined supply unit 104.

<Arrangement of Supply Unit in Array-type Processing Device>

Figure 2:
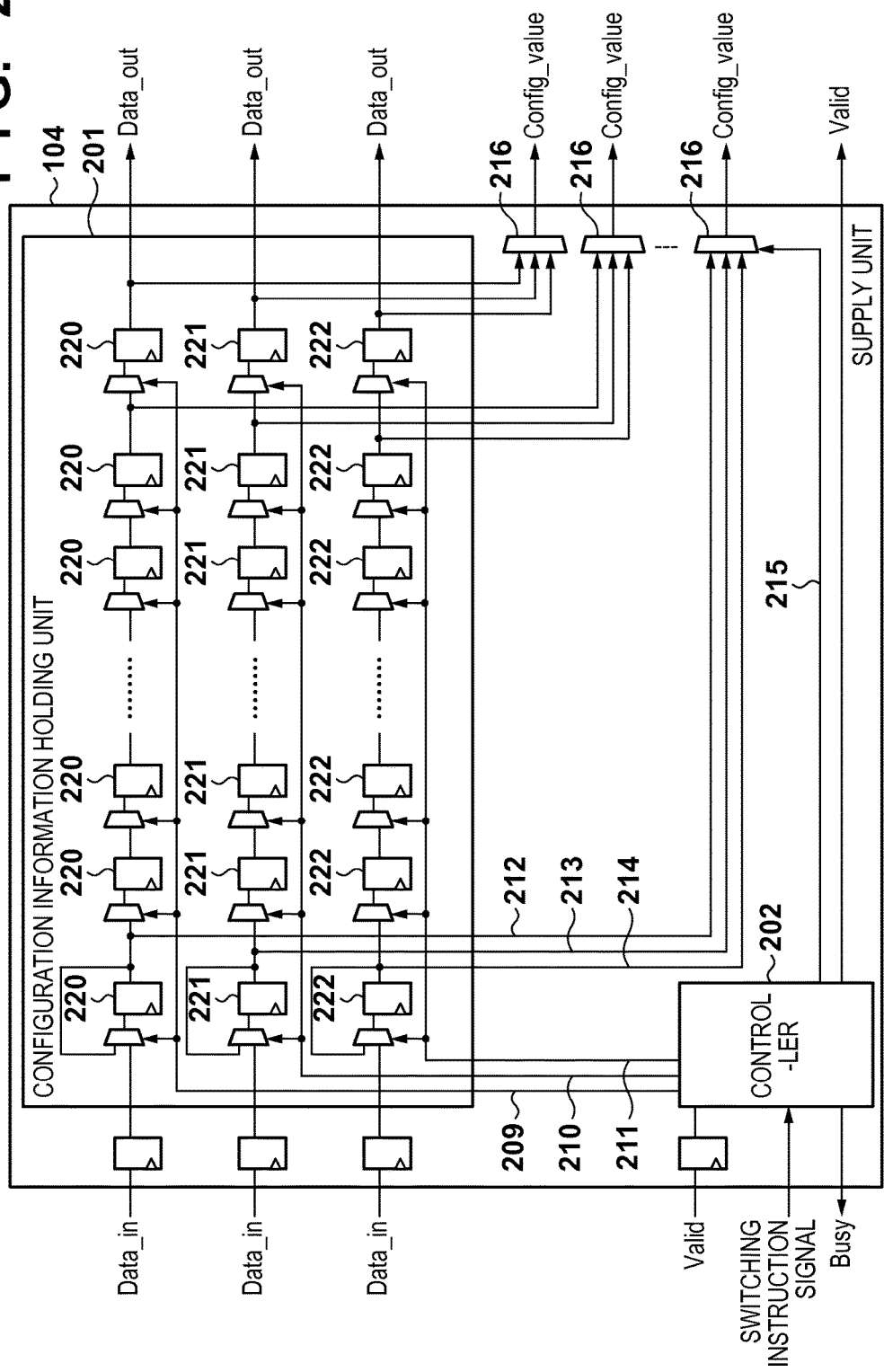
FIG. 2 is a block diagram showing details of a supply unit.
Figure 3:
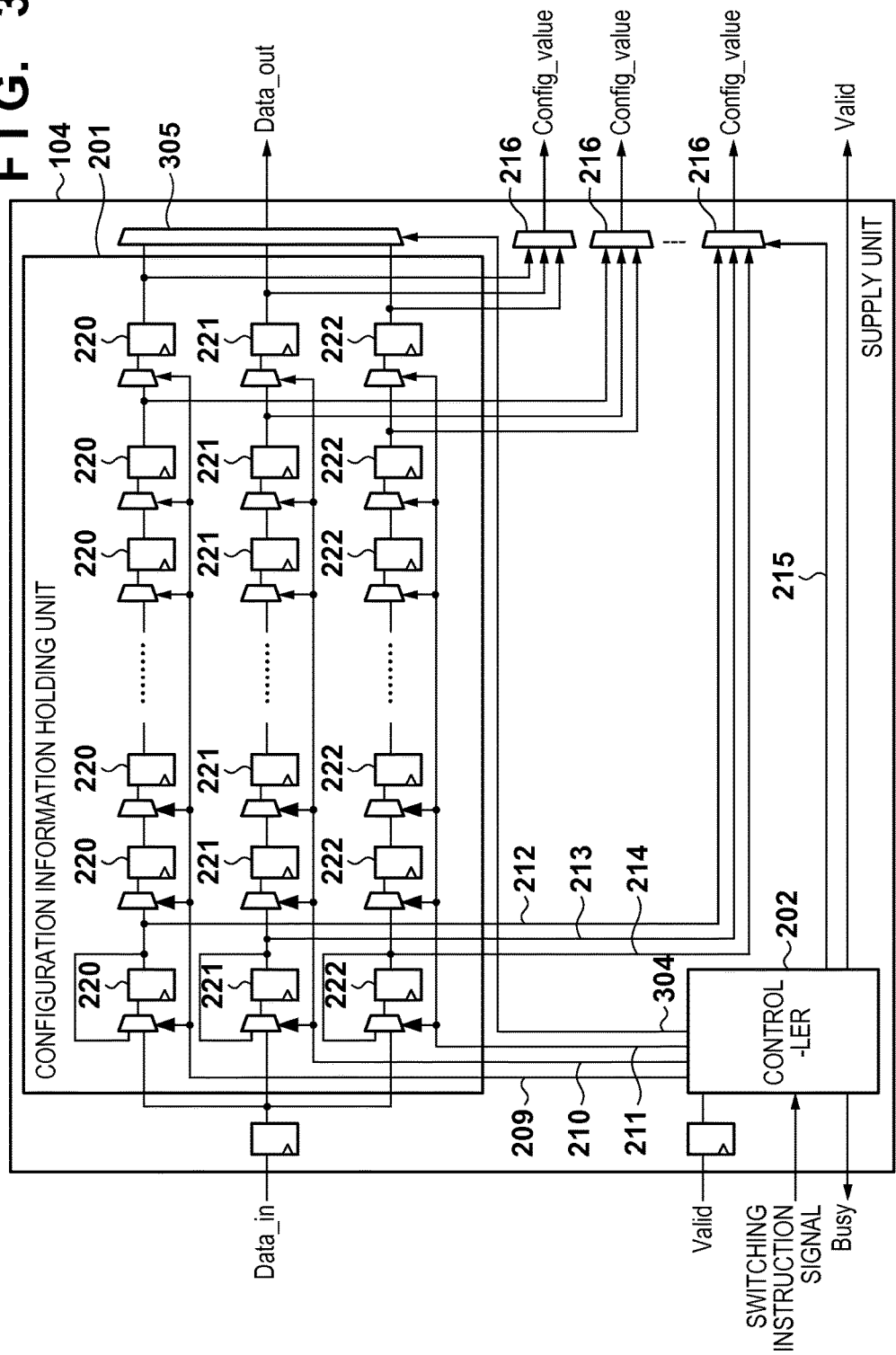
FIG. 3 is a block diagram showing another example of details of the supply unit.

FIG. 2 is a block diagram showing details of the supply unit 104 of the array-type processing device according to the first embodiment. Also, FIG. 3 is a block diagram showing another example of details of the supply unit 104. Note that in FIGS. 2 and 3, the same reference numerals denotes elements common to FIG. 1, and a description thereof will not be repeated.

Referring to FIG. 2, reference numeral 201 denotes a configuration information holding unit, which holds a plurality of pieces of configuration information received from the configuration information transfer bus 103. In FIG. 2, the configuration information transfer bus 103 is a function unit which transfers a plurality of configuration information signals. The configuration information holding unit 201 includes shift registers 220, 221, and 222 for respective configuration information signals. In this case, the shift registers 220, 221, and 222 are configured by flip-flops which can make both input fetch and hold operations. The input fetch/hold control is executed based on control signals 209, 210, and 211 output from a controller 202 (to be described later).

Note that when the configuration information transfer bus 103 transfers a plurality of configuration information signals, pieces of configuration information are transmitted while being interleaved for respective configuration information signals. For example, assume that when three configuration information signals (a, b, and c) are transferred, the system outputs pieces of configuration information while changing paths in turn like a→b→c→a→b→c for respective pieces of configuration information. FIG. 2 uses an example in which three configuration information signals are input from the configuration information transfer bus 103. However, the number of configuration information signals to be input is not limited to this. Also, when the same configuration information written in the shift register is to be reused, the configuration information held by the shift register may be copied to another shift register to reuse the configuration information.

The controller 202 is a function unit which controls the overall supply unit 104, and is configured to generate reception control signals 209, 210, and 211 of the shift registers 220, 221, and 222, to generate the Busy signal 112, and to generate a control signal 215.

When the Valid signal of the configuration information transfer bus 103 is asserted, the controller 202 judges that effective configuration information is transmitted, and asserts the reception control signal 209 in synchronism with the Valid signal. While the reception control signal 209 is asserted, the controller 202 transfers signals input from the configuration information transfer bus 103 to the subsequent stages by a shift operation. While the reception control signal 209 is deasserted, the shift registers 220 keep holding the configuration information. The reception control signals 210 and 211 assume the same role as the reception control signal 209 for the shift registers 221 and 222.

The Busy signal 112 is a signal which is asserted when configuration information cannot be received. More specifically, the Busy signal 112 is asserted when all of the shift registers 220, 221, and 222 hold effective information, and is deasserted when a space in which configuration information can be written is generated in the shift registers 220, 221, and 222.

The control signal 215 is a signal used to select configuration information to be output. In this case, the control signal 215 is a signal used to select configuration information required for processing from pieces of effective configuration information held by the shift registers 220, 221, and 222. Every time the switching instruction signal 105 is asserted, the control signal 215 selects configuration information required for the next processing. For example, when all of the shift registers 220, 221, and 222 hold pieces of effective configuration information, and these pieces of configuration information of the shift registers 220, 221, and 222 are to be used in turn, the control signal 215 outputs a signal used to select configuration information of the shift register 222. When the next switching instruction signal 105 is asserted, the control signal 215 is switched from the signal used to select configuration information from the shift register 222 to that used to select configuration information from the shift register 220. When the switching instruction signal 105 is further asserted, the control signal 215 is switched from the signal used to select configuration information from the shift register 220 to that used to select configuration information from the shift register 221.

Configuration information 212, configuration information 213, and configuration information 214 are those which are respectively output from the shift registers 220, 221, and 222. Each selection circuit 216 selects one of three pieces of configuration information 212, 213, and 214 according to a value of the control signal 215. The configuration information selected by the selection circuit 216 is output via the signal line 111.

FIG. 3, which shows another example of details of the supply unit 104, shows the arrangement when the configuration information transfer bus 103 is configured to transfer one configuration information signal. Unlike in the arrangement shown in FIG. 2, a selection circuit 305 and a control signal 304 used to control selection of the selection circuit 305 are used. Since the arrangement of the configuration information holding unit 201 is the same as that shown in FIG. 2, a description thereof will not be repeated.

After the configuration information transfer bus 103 inputs one configuration information signal to the supply unit 104, it is divided into a plurality of paths to output the configuration information signal to the shift registers 220, 221, and 222. Reception control of the configuration information signal in the shift registers 220, 221, and 222 is executed using the control signals 209, 210, and 211 output from the controller 202 as in FIG. 2. In this case, assume that the reception control signals 209, 210, and 211 control to receive configuration information input from the configuration information transfer bus 103 while interleaving the configuration information in turn to the shift registers 220, 221, and 222. For example, when configuration information is received five times, the reception control signals 209, 210, and 211 control the shift registers 220, 221, and 222 to receive configuration information in order of the shift register 220→221→222→220→221.

The control signal 304 is used to select a signal to be output from the selection circuit 305 (to be described later), and generates a control signal required to control the selection circuit 305 to select a value of a shift register which is instructed to receive by the control signal 209, 210, or 211. The selection circuit 305 is used to select data received by the shift registers 220, 221, and 222, and one of signals output from the shift registers 220, 221, and 222 is selected by the selection circuit 305.

Note that the arrangement shown in FIG. 3 includes three shift registers 220, 221, and 222. However, the number of shift registers is not limited to three, and the arbitrary number of shift registers can be used. In the aforementioned example, pieces of configuration information are held using the plurality of shift registers. However, the method of holding configuration information is not limited to such specific method. For example, pieces of configuration information may be parallelly received using a plurality of signal lines, and the pieces of received configuration information may be controlled to be held using an address generator which uses automatic address count up, automatic pointer increment, and the like. Alternatively, shift registers may be connected in a single line by a daisy chain mode to hold configuration information. Also, configuration information may be held in a register file or SRAM.

<Arrangement of Overall System Including Array-Type Processing Device>

Figure 13:
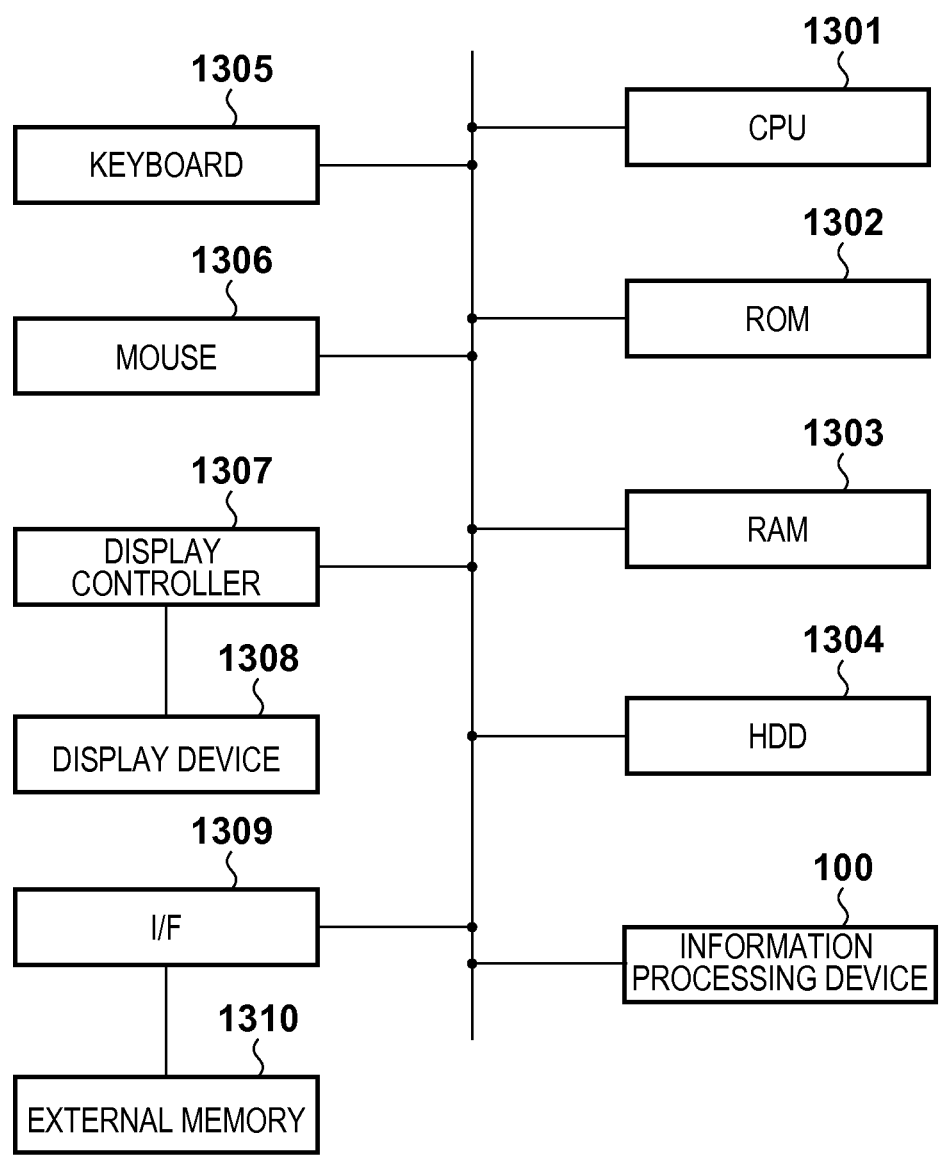
FIG. 13 is a block diagram showing the overall arrangement of a system including an array-type processing device.

FIG. 13 shows the overall arrangement of an information processing system including the array-type processing device. A CPU 1301 is a function unit which controls the overall apparatus. A ROM 1302 is a function unit which stores a boot program and the like, and a RAM 1303 is a function unit which serves as a work area of the CPU 1301 or stores an OS (Operating System) and applications.

A hard disk drive (HDD) 1304 stores the OS, an application required to generate configuration information, and various data. A keyboard 1305 and mouse 1306 function as a user interface.

A display controller 1307 incorporates a video memory and display controller, and transmits a video signal to a display device 1308 to control to display various screens. An interface (I/F) 1309 is a function unit required to connect and communicate with various external devices.

An information processing device 100 corresponds to the aforementioned array-type processing device, and an internal register of the information processing device 100 is allocated in an area which allows read and write accesses from the CPU 1301, and in which configuration information is written by the CPU 1301. Also, the information processing device 100 can access (read/write accesses to) the RAM 1303, and loads input data from the RAM 1303 and stores a processing result according to addresses set by configuration information.

When a power supply of the system is turned on, the CPU 1301 executes the boot program stored in the ROM 1302, and loads the OS stored in the HDD 1304 onto the RAM 1303. After that, when the CPU 1301 launches an application used to generate configuration information, it serves as a device for generating the configuration information.

For example, the CPU 1301 allocates input data required for processing of the information processing device 100 at a predetermined address of the RAM 1303. Next, the CPU 1301 writes the generated configuration information in the internal register of the information processing device 100 to execute processing using the array-type processing device. In the first embodiment, the CPU 1301 monitors an execution status of a task processed by the information processing device 100, and also executes assertion control of the switching instruction signal 105 (selection control unit).

<Holding Control and Switching Control of Configuration Information>

FIG. 4 exemplarily shows various tables used in the supply unit. A configuration information holding control method and a configuration information switching control method using tables 400a to 400d will be described below. Note that in FIG. 4, all logical values described in the tables are described in positive logic. For this reason, in the following description, assertion corresponds to "1", and deassertion corresponds to "0".

A table 400a is a Write_Pointer generation table required to designate a shift register in which input configuration information is to be written. A first column indicates a value of a signal (to be referred to as a Config_en signal hereinafter) which is asserted when configuration information input from the configuration information transfer bus 103 sets values in all registers in the shift register. The Config_en signal is a pulse signal which is asserted for only one clock cycle when configuration information is set in all registers of the shift register, and is then deasserted.

A second column (current Write_Pointer) indicates a shift register number (to be referred to as a Write_Pointer hereinafter) in which input configuration information is to be written. In this case, when the Write_Pointer is "00", the shift register 220 is selected as a write target; when it is "01", the shift register 221 is selected as a write target; and when it is "10", the shift register 222 is selected as a write target, and configuration information from the configuration information transfer bus 103 is written.

A third column (next Write_Pointer) indicates a Write_Pointer value at the next clock when the Config_en signal is asserted. The Write_Pointer value is incremented in response to the next clock when the Config_en signal is asserted.

A table 400b is a table which specifies generation of the reception control signals 209, 210, and 211 for the shift registers 220, 221, and 222. In the table 400b, a first column indicates a value of the Valid signal received from the configuration information transfer bus 103. A second column indicates a Write_Pointer value. A third column indicates a signal to be asserted when conditions of the first and second columns are satisfied.

When the Valid signal is "0", all the reception control signals 209, 210, and 211 are deasserted. When the Valid signal is "1" and the Write_Pointer is "00", the reception control signal 209 is asserted. When the Valid signal is "1" and the Write_Pointer is "01", the reception control signal 210 is asserted. When the Valid signal is "1" and the Write_Pointer is "10", the reception control signal 211 is asserted.

Using the tables 400a and 400b with the above configurations, input configuration information can undergo write control while being sequentially interleaved to the respective shift registers.

A table 400c is used to manage whether or not the shift registers 220, 221, and 222 include spaces in which configuration information can be written, and is used in generation of the Busy signal 112. In the table 400c, a first column indicates a value of the Config_en signal described in the table 400a. A second column indicates a value of the switching instruction signal 105.

A third column (current Config_Count) indicates the number of pieces of effective configuration information (to be referred to as a Config_Count hereinafter) currently held in the shift registers. A fourth column (next Config_Count) indicates a value of the Config_Count in the next clock cycle when the Config_en signal or the switching instruction signal 105 is asserted.

In the table 400c, the value of the Config_Count is incremented at the next clock when the Config_en signal is asserted, or is decremented at the next clock when the switching instruction signal 105 is asserted. In case of combinations of the Config_en signal and switching instruction signal 105 other than those described in the table 400c, the value of the Config_Count remains unchanged. In this case, since the number of shift registers which can hold configuration information is "3", the Busy signal 112 is asserted when the Config_Count is "11". When the Config_Count is other than "11", the Busy signal 112 is deasserted.

A table 400d is used to generate the control signal 215 required to select configuration information set in the shift registers 220, 221, and 222. In the table 400d, a first column indicates a value of the switching instruction signal 105. A second column (current Read_Pointer) is a signal (to be referred to as a Read_Pointer hereinafter) which points to a shift register to be currently selected. In this case, when the Read_Pointer is "00", the control signal 215 used to select the control signal 209 is generated; when it is "01", the control signal 215 used to select the control signal 210 is generated; or when it is "10", the control signal 215 used to select the control signal 211 is generated, and is output via the signal line 111. A third column (next Read_Pointer) indicates a value of the Read_Pointer in the next clock cycle when the switching instruction signal 105 is asserted.

Note that the table 400d indicates that when the switching instruction signal 105 is asserted, the Read_Pointer is incremented, and when the value of the Read_Pointer is "10", it returns to "00". In this case, input configuration information is sequentially written while being interleaved from the shift register 220 to the shift register 222. For this reason, by reading out configuration information while being interleaved from the shift register 220 to the shift register 222, the configuration information can be correctly read out.

Using the aforementioned tables 400c and 400d, when a plurality of pieces of configuration information are held in the shift registers 220, 221, and 222, the configuration information can be switched in the next clock cycle when the switching instruction signal 105 is asserted. That is, the configuration information write control, bus communication control, and read control can be implemented.

<Switching Operation Example of Configuration Information in Array-type Processing Device>

An example in which a plurality of pieces of configuration information are sequentially switched to execute a series of processes in the array-type processing device according to the first embodiment will be described below. In this case, processes using five different pieces of configuration information (FIG. 6) as the series of processes will be exemplified below.

Figure 5:
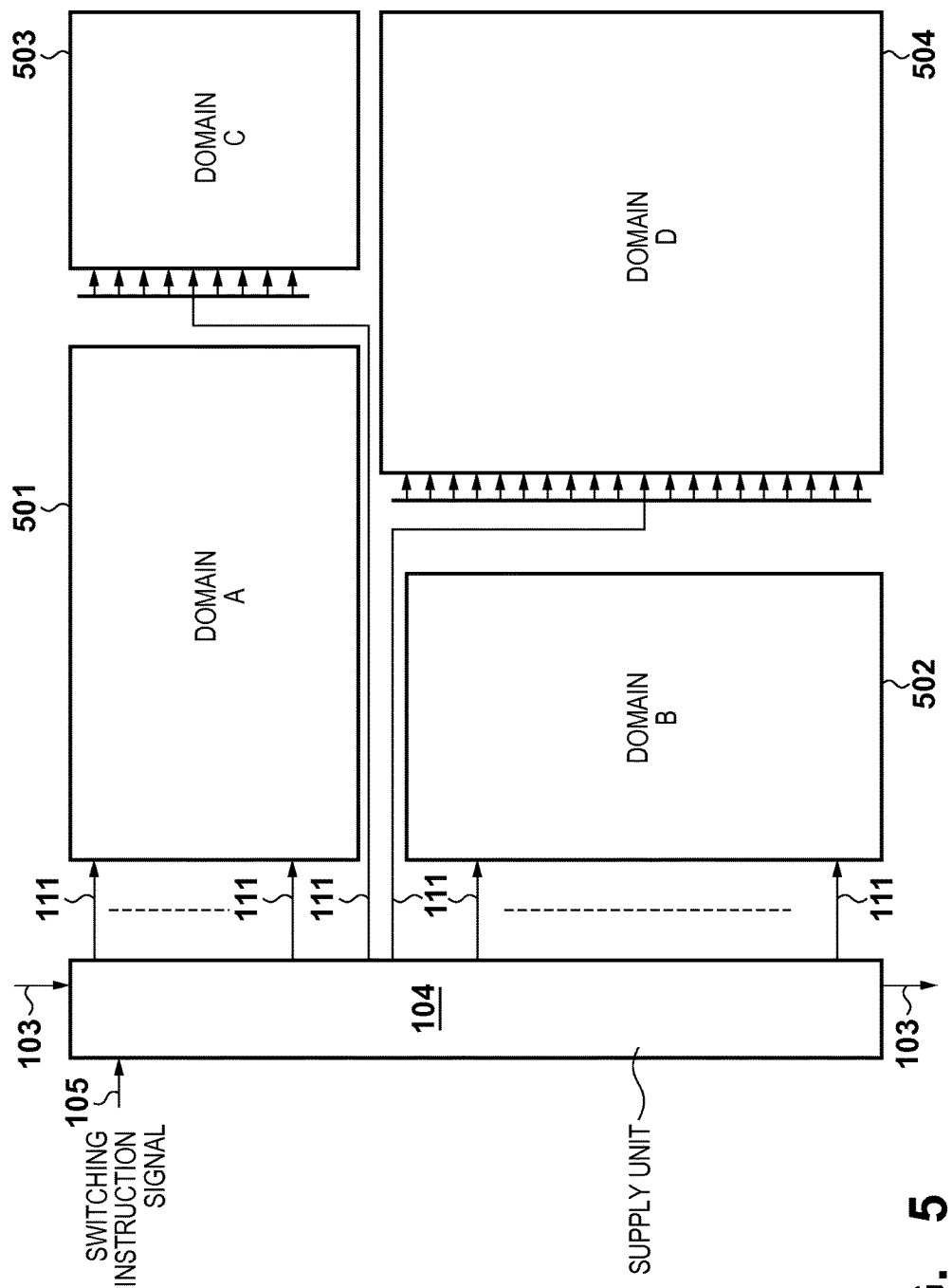
FIG. 5 is a block diagram showing the relationship between PSO domains and the supply unit in the array-type processing device according to the first embodiment.

FIG. 5 is a block diagram showing the relationship between PSO domains (processing units) and the supply unit in the array-type processing device according to the first embodiment. In FIG. 5, four PSO domains 501, 502, 503, and 504 (one or more processing units) are allocated. The PSO domains 501, 502, 503, and 504 will be respectively referred to as domains A, B, C, and D hereinafter.

Each PSO domain includes routers and PEs. Assume that the total number of routers and PEs included in the domain A is 150. Likewise, assume that the total number of routers and PEs included in the domain B is 80, the total number of routers and PEs included in the domain C is 120, and the total number of routers and PEs included in the domain D is 200. Also, assume that the system includes one supply unit 104, which supplies configuration information to the domains A, B, C, and D via the signal lines 111.

As for configuration information of routers and PE, 4-bit configuration information is required to be set for each element. For this reason, the domain A requires configuration information of 600 (=150×4) bits, the domain B requires configuration information of 320 (=80×4) bits, the domain C requires configuration information of 480 (=120×4) bits, and the domain D requires configuration information of 800 (=200×4) bits.

In this case, assume that the supply unit 104 uses a method of holding configuration information in shift registers. Therefore, when a plurality of pieces of configuration information are to be held, a shift register of 2200 (=600+320+480+800) bits per configuration information is required. Furthermore, a write time period required to write one configuration information (2200-bit information) in the shift register is 2200 clock cycles.

FIG. 6 shows the PSO domains used in the processes using respective pieces of configuration information. A row 601 indicates the relationship between configuration information 1 and the PSO domains, and that routers and PEs respectively included in the three PSO domains, that is, the domains A, B, and C are used upon processing of configuration information 1. Likewise, a row 602 indicates the relationship between configuration information 2 and the PSO domains, and that routers and PEs respectively included in the two PSO domains, that is, the domains A and C are used upon processing of configuration information 2.

Likewise, a row 603 indicates the relationship between configuration information 3 and the PSO domains, and that routers and PEs respectively included in the four PSO domains, that is, the domains A, B, C, and D are used upon processing of configuration information 3. A row 604 indicates the relationship between configuration information 4 and the PSO domains, and that routers and PEs respectively included in the PSO domain of the domain D are used upon processing of configuration information 4. A row 605 indicates the relationship between configuration information 5 and the PSO regions, and that routers and PEs respectively included in the PSO domains of the domains B, C, and D are used upon processing of configuration information 5.

Execution conditions upon rewriting configuration information according to the first embodiment will be described below. Note that the power resume timing of each PSO domain and power resume domain are controlled by the CPU 1301 of the system shown in FIG. 13.

The configuration of the array-type processing device is rewritten and transitioned in an order of configuration information 1→configuration information 2→configuration information 3→configuration information 4→configuration information 5.

A time period required for each of the domains A, B, C, and D to resume a power supply from a power shut off state and to transition to a power stable state is 6000 clock cycles. Assume that execution of power resume processing is started when the next configuration information to be used is settled. Also, assume that a power resume processing target domain is derived from a difference between the current configuration information in execution and the next configuration information to be used. That is, the power resume processing is executed for a domain which is not used by the current configuration information in execution and is used by the next configuration information to be used.

A data processing time period using configuration information 1 requires 10000 clock cycles. Likewise, a data processing time period using configuration information 2 requires 18000 clock cycles, data processing time period using configuration information 3 requires 10000 clock cycles, a data processing time period using configuration information 4 requires 26000 clock cycles, and a data processing time period using configuration information 5 requires 12000 clock cycles.

Figure 7:
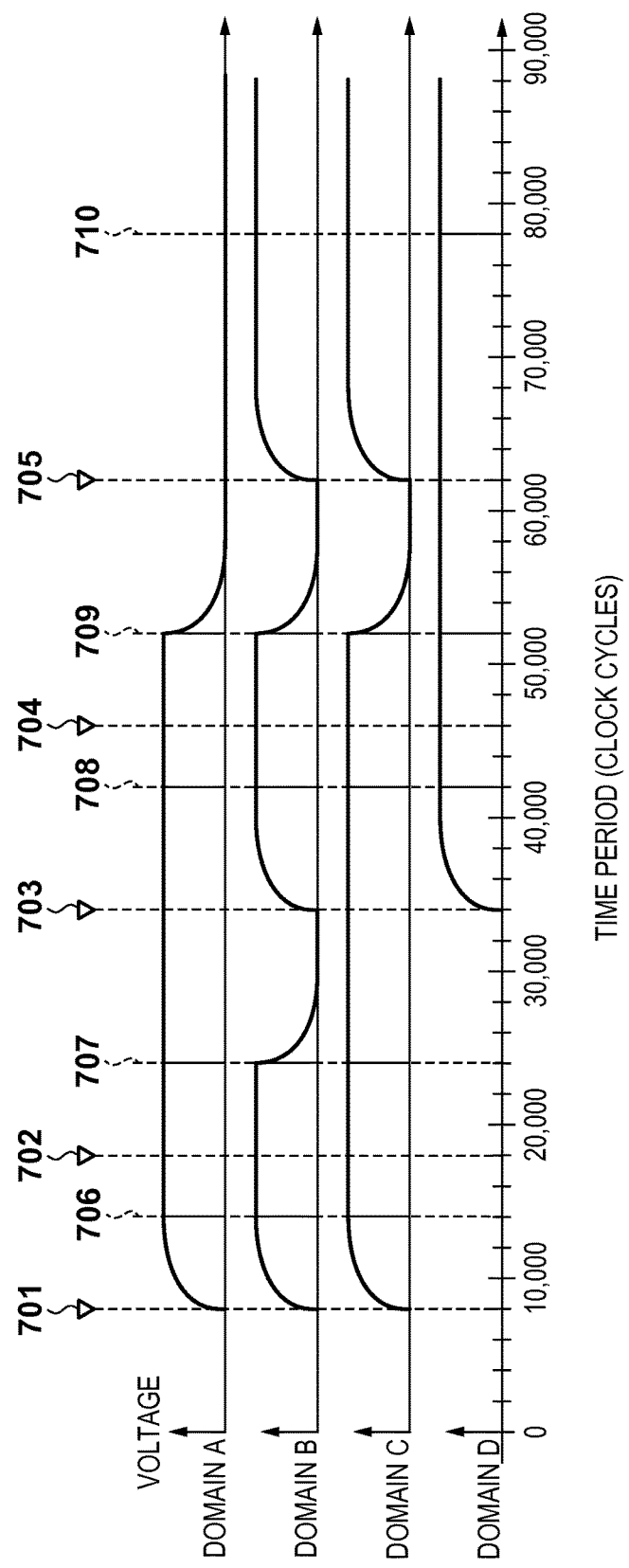
FIG. 7 is a graph exemplarily showing voltage-time period relations in respective PSO domains.

FIG. 7 exemplarily shows voltage-time period relations in the respective PSO domains. In FIG. 7, the ordinate plots a voltage value, and the abscissa plots a clock elapsed time period. Note that FIG. 7 shows the relations between the voltage value and clock elapsed time period in the domains A, B, C, and D in turn from the top. Note that each PSO domain is set in a power OFF state in an initial state (time=0).

At time 701, configuration information 1 is settled. Likewise, configuration information 2 is settled at time 702, configuration information 3 is settled at time 703, configuration information 4 is settled at time 704, and configuration information 5 is settled at time 705.

That is, assume that configuration information 1 is settled after an elapse of 8000 clock cycles since the system initial state. Also, configuration information 2 is settled after an elapse of 18000 clock cycles since the system initial state. Likewise, configuration information 3 is settled after an elapse of 34000 clock cycles since the system initial state, configuration information 4 is settled after an elapse of 46000 clock cycles since the system initial state, and configuration information 5 is settled after an elapse of 62000 clock cycles since the system initial state.

After configuration information 1 is settled at time 701, the system starts switching control of power supplies of the PSO domains, that is, the domains A, B, and C required for the processing of configuration information 1 to an ON state, and starts transmission of configuration information to the supply unit 104. As described above, a time period required to write configuration information in the shift register of the supply unit 104 is 2200 clock cycles, and a time period required to transition from the power shut off state to the power stable state is 6000 clock cycles. For this reason, the write operation of configuration information in the shift register is complete before the power supplies of the domains A, B, and C are stabilized. At time 706, the power supplies of the domains A, B, and C are stabilized, and the processing using configuration information 1 is started immediately after time 706.

Configuration information 2 (second configuration information) to be used next to configuration information 1 (first configuration information) is settled at time 702 after an elapse of 4000 clock cycles since time 706 at which the power supplies are stabilized. Since the data processing time period using configuration information 1 requires 10000 clock cycles, the write operation of configuration information 2 in the shift register in the supply unit 104 is complete within the data processing time period using configuration information 1. The shift register holds the written configuration information until use time of that configuration information.

At time 707, the processing using configuration information 1 is complete. Simultaneously with completion of the processing of configuration information 1 at time 707, the switching instruction signal 105 is asserted, and configuration information to be output from the signal line 111 is immediately switched from configuration information 1 to configuration information 2, thus starting processing using configuration information 2. Also, at time 707, the power supply of the domain B which is not used by configuration information 2 is turned off.

Configuration information 3 to be used next to configuration information 2 is settled at time 703 after an elapse of 10000 clock cycles since time 707. Since the data processing time period using configuration information 2 requires 18000 clock cycles, the write operation of configuration information 3 in the shift register in the supply unit 104 is complete within the data processing time period using configuration information 2. At time 703, control for turning on the power supplies of the domains B and D to be newly used by configuration information 2 is started.

At time 708, the processing using configuration information 2 is complete. Upon completion of the processing of configuration information 2 at time 708, the switching instruction signal 105 is asserted to immediately switch configuration information to be output from the signal line 111 from configuration information 2 to configuration information 3, thus starting processing using configuration information 3.

Configuration information 4 to be used next to configuration information 3 is settled at time 704 after an elapse of 4000 clock cycles since time 708. Since the data processing time period using configuration information 3 requires 10000 clock cycles, the write operation of configuration information 4 in the shift register in the supply unit 104 is complete within the data processing time period using configuration information 3.

At time 709, the processing using configuration information 3 is complete. Upon completion of the processing of configuration information 3 at time 709, the switching instruction signal 105 is asserted to immediately switch configuration information to be output from the signal line 111 from configuration information 3 to configuration information 4, thus starting processing using configuration information 4. At time 709, the power supplies of the domains A, B, and C which are not used by configuration information 4 are turned off.

Configuration information 5 to be used next to configuration information 4 is settled at time 705 after an elapse of 10000 clock cycles since time 709. Since the data processing time period using configuration information 4 requires 16000 clock cycles, the write operation of configuration information 5 in the shift register in the supply unit 104 is complete within the data processing time period using configuration information 4. At time 705, control for turning on the power supplies of the domains B and C to be newly used by configuration information 5 is started.

At time 710, the processing using configuration information 4 is complete. Upon completion of the processing of configuration information 4 at time 710, the switching instruction signal 105 is asserted to immediately switch configuration information to be output from the signal line 111 from configuration information 4 to configuration information 5, thus starting processing using configuration information 5. Then, after an elapse of 62000 clock cycles since the system initial state, processing using configuration information 5 is complete, thus ending the series of processes. At this time, for example, the power supplies of the domains B, C, and D are turned off to return to the initial state.

As described above, according to the array-type processing device of the first embodiment, the supply unit 104 which supplies configuration information of PEs and routers is allocated in the domain to which power supply is always supplied. Thus, configuration information to be used in subsequent processing can be written independently of power supply states to the respective PSO domains. Especially, since the supply unit 104 is configured to hold both the currently used configuration information and next configuration information to be used, the configuration information can be switched at higher speed.

Second Embodiment

The second embodiment will explain an example in which a supply unit is allocated for each PSO domain. Note that in the following description, the same reference numerals denote elements common to those of the first embodiment, and a detailed description thereof will not be repeated.

<Arrangement of Array-Type Processing Device>

Figure 8:
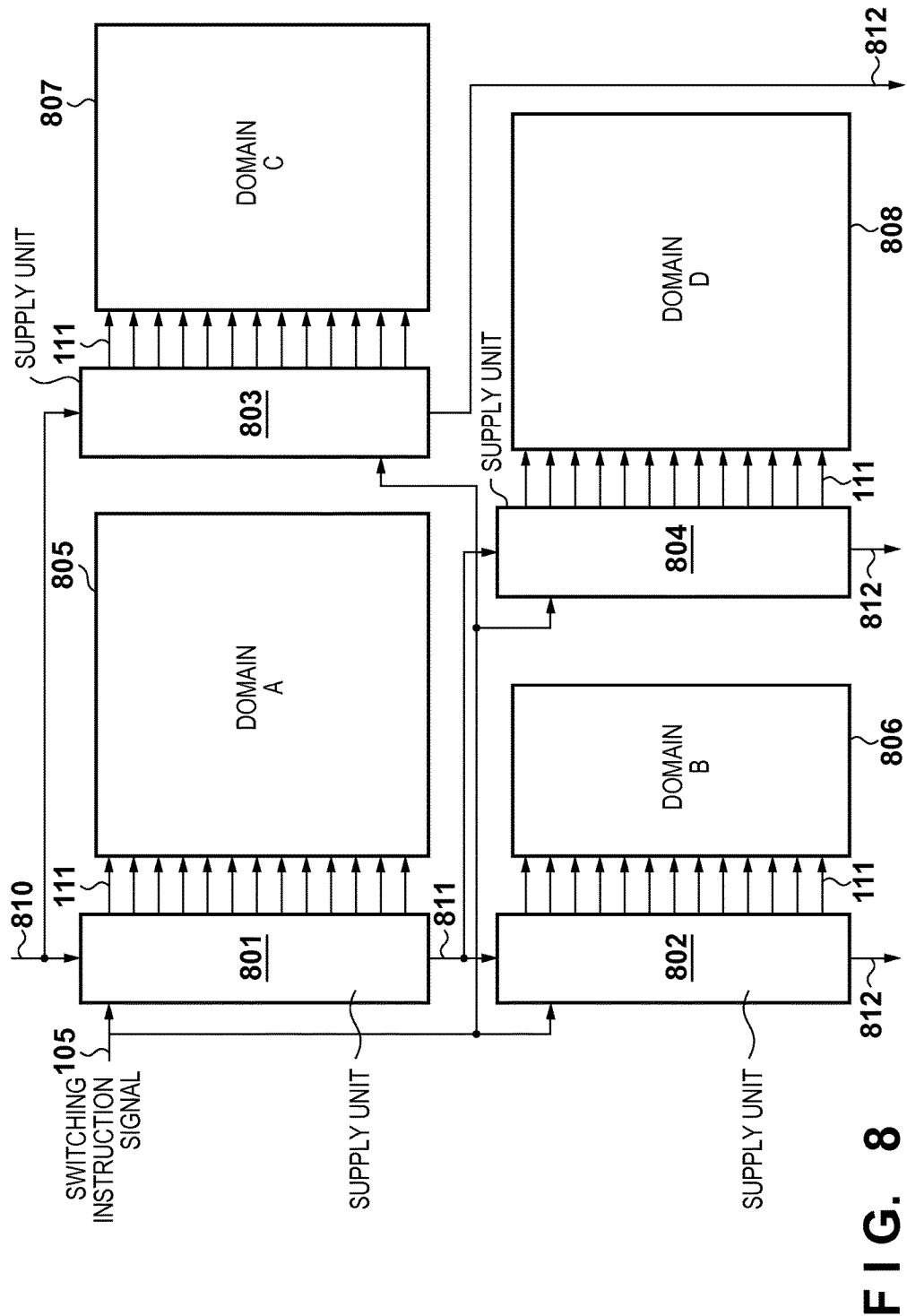
FIG. 8 is a block diagram showing the relationship between PSO domains and supply units in an array-type processing device according to the second embodiment.

FIG. 8 is a block diagram showing the relationship between PSO domains and supply units in an array-type processing device according to the second embodiment. In FIG. 8, four PSO domains 805, 806, 807, and 808 are allocated. The PSO domains 805, 806, 807, and 808 will be respectively referred to as domains A, B, C, and D hereinafter.

A supply unit 801 is a function unit which holds configuration information to be supplied to the domain A, and supplies configuration information to the domain A. Likewise, a supply unit 802 holds configuration information to be supplied to the domain B, a supply unit 803 holds configuration information to be supplied to the domain C, and a supply unit 804 holds configuration information to be supplied to the domain D.

Buses 810, 811, and 812 are used to transfer configuration information together with corresponding address information. Note that an address is information required to identify a bus control unit or supply unit. The bus 810 transfers configuration information to both the supply units 801 and 803. The bus 811 transfers configuration information output (transferred) from the supply unit 801 to both the supply units 802 and 803. The bus 812 transfers configuration information output (transferred) from the supply unit 802, 804, or 803 to a subsequent supply unit (not shown). Note that when the supply units 802 and 804 and a subsequent supply unit connected to the supply unit 803 are not arranged, the bus 812 is not necessary. A switching instruction signal 105 is respectively input to the supply units 801, 802, 803, and 804. When the switching instruction signal 105 is asserted, each of the supply units 801 to 804 switches configuration information to be output to the corresponding PSO domain.

Note that in this example, one supply unit is allocated for one PSO domain. However, in place of such one-to-one allocation, one supply unit may be allocated for a plurality of PSO domains.

<Arrangement of Supply Unit in Arrangement of Array-Type Processing Device>

Figure 9:
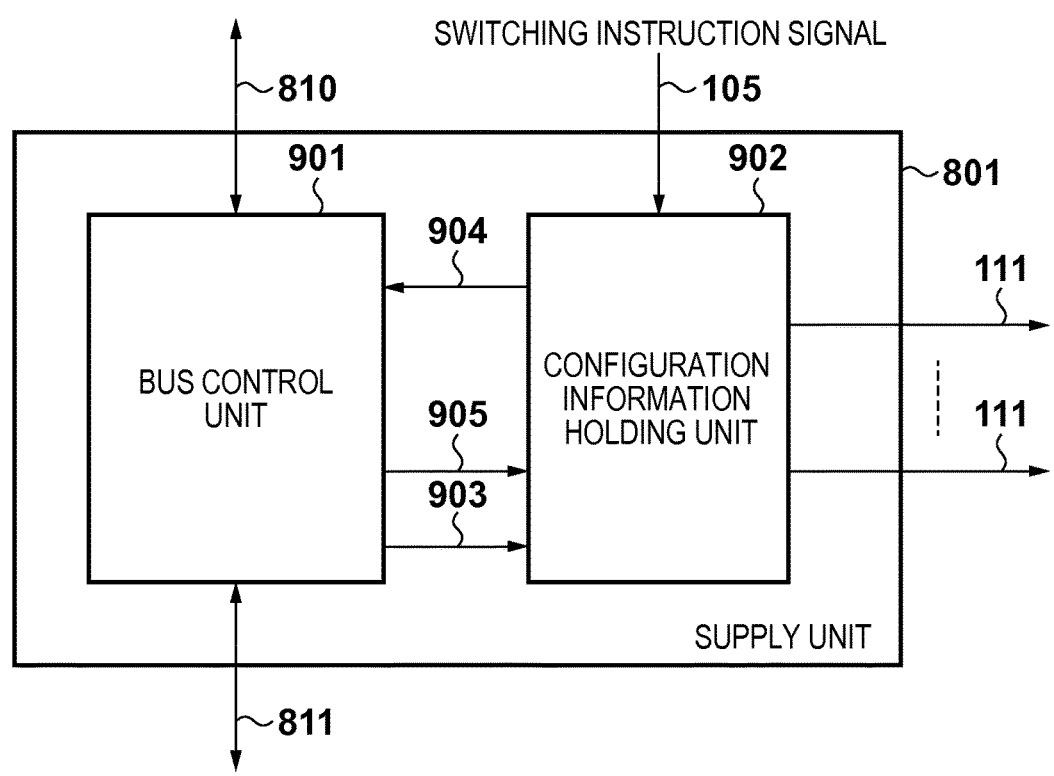
FIG. 9 is a block diagram showing the internal arrangement of the supply unit.

FIG. 9 shows the internal arrangement of the supply unit. A bus control unit 901 is a function unit which executes bus control of the configuration information transfer buses 810 and 811, and issues a write instruction of configuration information to a configuration information holding unit 902 (to be described later).

A signal 905 is required to transmit configuration information from the bus control unit 901 to the configuration information holding unit 902, and transmits configuration information received via the configuration information transfer bus 810. A signal 903 is a configuration information write enable signal to be transmitted from the bus control unit 901 to the configuration information holding unit 902, and is asserted in synchronism with configuration information transmitted using the signal 905.

The configuration information holding unit 902 includes a register or SRAM which can hold a plurality of pieces of configuration information, and holds configuration information included in the signal 905 when the configuration information write enable signal 903 is asserted. The configuration information holding unit 902 outputs configuration information required for the current processing via signal lines 111, and outputs configuration information required for the next processing to routers and PEs in the corresponding PSO domain via the signal lines 111 when the switching instruction signal 105 is asserted.

A Busy signal 904 is transmitted from the configuration information holding unit 902 to the bus control unit 901, and is asserted while the register or SRAM used to hold configuration information in the configuration information holding unit 902 is "Full".

<Sequence of Configuration Information Holding Control in Supply Unit>

Figure 10:
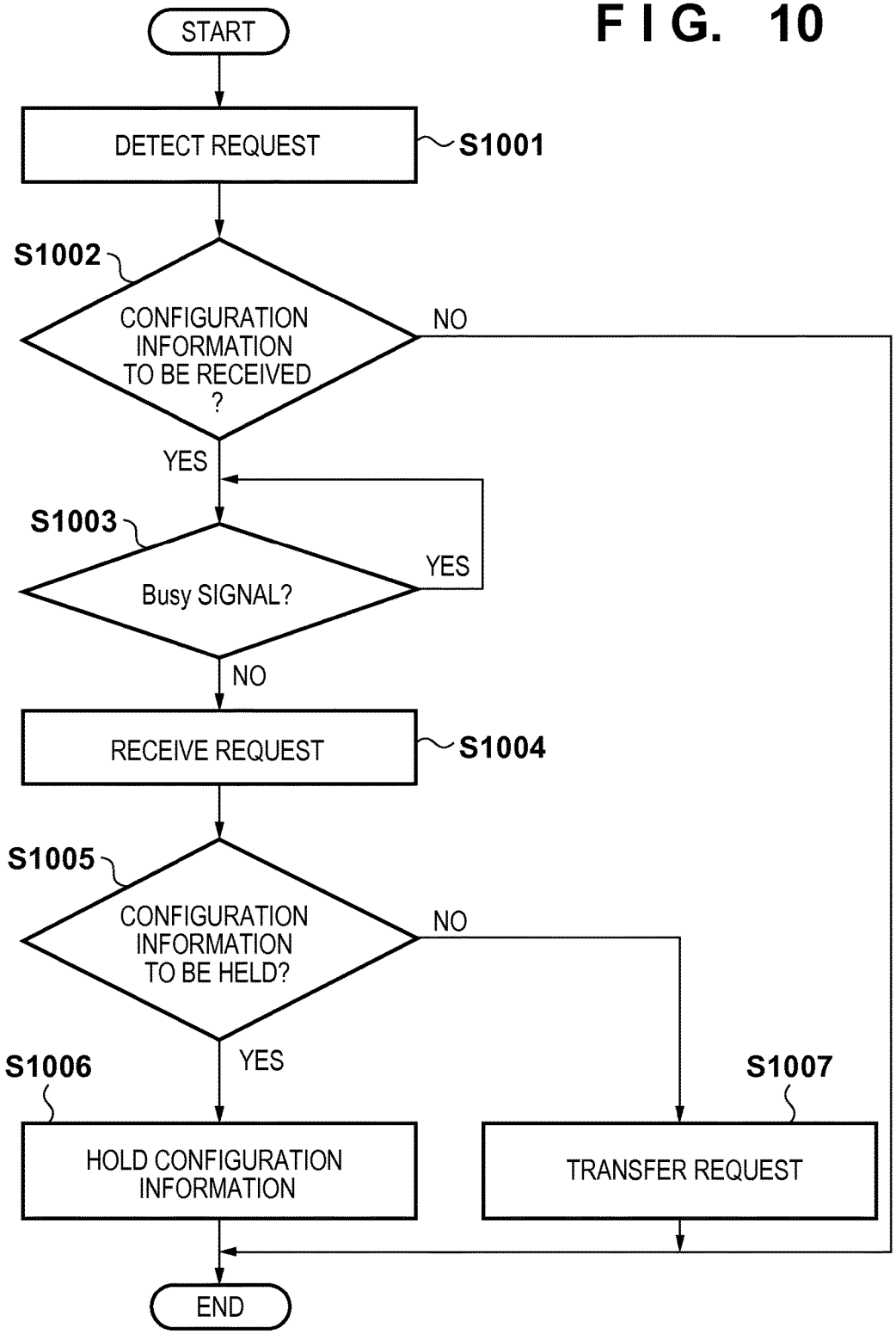
FIG. 10 is a flowchart for explaining holding control of configuration information in the supply unit.

FIG. 10 is a flowchart for explaining configuration information holding control in the supply unit.

In step S1001, the bus control unit 901 detects a request of configuration information transmitted from the configuration information transfer bus 810. If the bus control unit 901 detects the request, the process advances to step S1002.

The bus control unit 901 determines in step S1002 based on an address included in the request detected in step S1001 whether or not corresponding configuration information should be received. In case of configuration information to be held by the configuration information holding unit 902 or that to be held by another supply unit connected ahead of the configuration information transfer bus 811, the bus control unit 901 determines that corresponding configuration information should be received, and the process advances to step S1003. On the other hand, in case of neither configuration information to be held by the configuration information holding unit 902 nor that to be held by another supply unit connected ahead of the configuration information transfer bus 811, the bus control unit 901 determines that corresponding configuration information should not be received, thus ending the processing.

The bus control unit 901 determines in step S1003 whether or not the Busy signal 904 is asserted. If the Busy signal 904 is not asserted, the process advances to step S1004; if the Busy signal 904 is asserted, the determination process of step S1003 is repeated until the Busy signal 904 is deasserted.

In step S1004, the bus control unit 901 receives configuration information transmitted from the configuration information transfer bus 810, thus completing the transmission request from the configuration information transfer bus 810. If the bus control unit 901 completes the request, the process advances to step S1005.

The bus control unit 901 determines in step S1005 whether or not the received configuration information is to be held by the configuration information holding unit 902. If the configuration information is to be held by the configuration information holding unit 902, the process advances to step S1006; otherwise (that is, if the configuration information is to be held by another supply unit), the process advances to step S1007.

In step S1006, the bus control unit 901 holds the configuration information received in step S1004 in the configuration information holding unit 902. The bus control unit 901 asserts the signal 903 synchronously with transmission of the received configuration information via the signal 905, thus writing the configuration information in the configuration information holding unit 902.

In step S1007, the bus control unit 901 transfers the configuration information received in step S1004 onto the configuration information transfer bus 811. More specifically, the bus control unit 901 transmits a transfer request of configuration information via the configuration information transfer bus 811. By executing the aforementioned sequence by a bus control unit in a supply unit connected ahead of the configuration information transfer bus 811, the configuration information can be held by each supply unit.

As described above, according to the second embodiment, the example in which the supply unit is allocated for each PSO domain has been explained. With this arrangement, wirings at the time of layout of an LSI can be easily optimized.

For example, at the time of layout of an LSI, the supply unit 801 and PSO domain 805 are allocated in parallel at neighboring positions, so as to allow layout with the shortest wiring length of the signal lines 111 which connects the supply unit 801 and PSO domain 805, thus reducing a chip area. Signals which pass between respective PSO domains are only those of the switching instruction signal 105 and the configuration information transfer bus 811 so as to reduce a wiring region between the PSO domains, thus further reducing a chip area.

Third Embodiment

The third embodiment will explain an arrangement in which when a power supply to a PSO domain in which routers and PEs are allocated transitions from ON to OFF, each router and PE save configuration information supplied to themselves in retention registers.

<Arrangement of Array-Type Processing Device>

Figure 11:
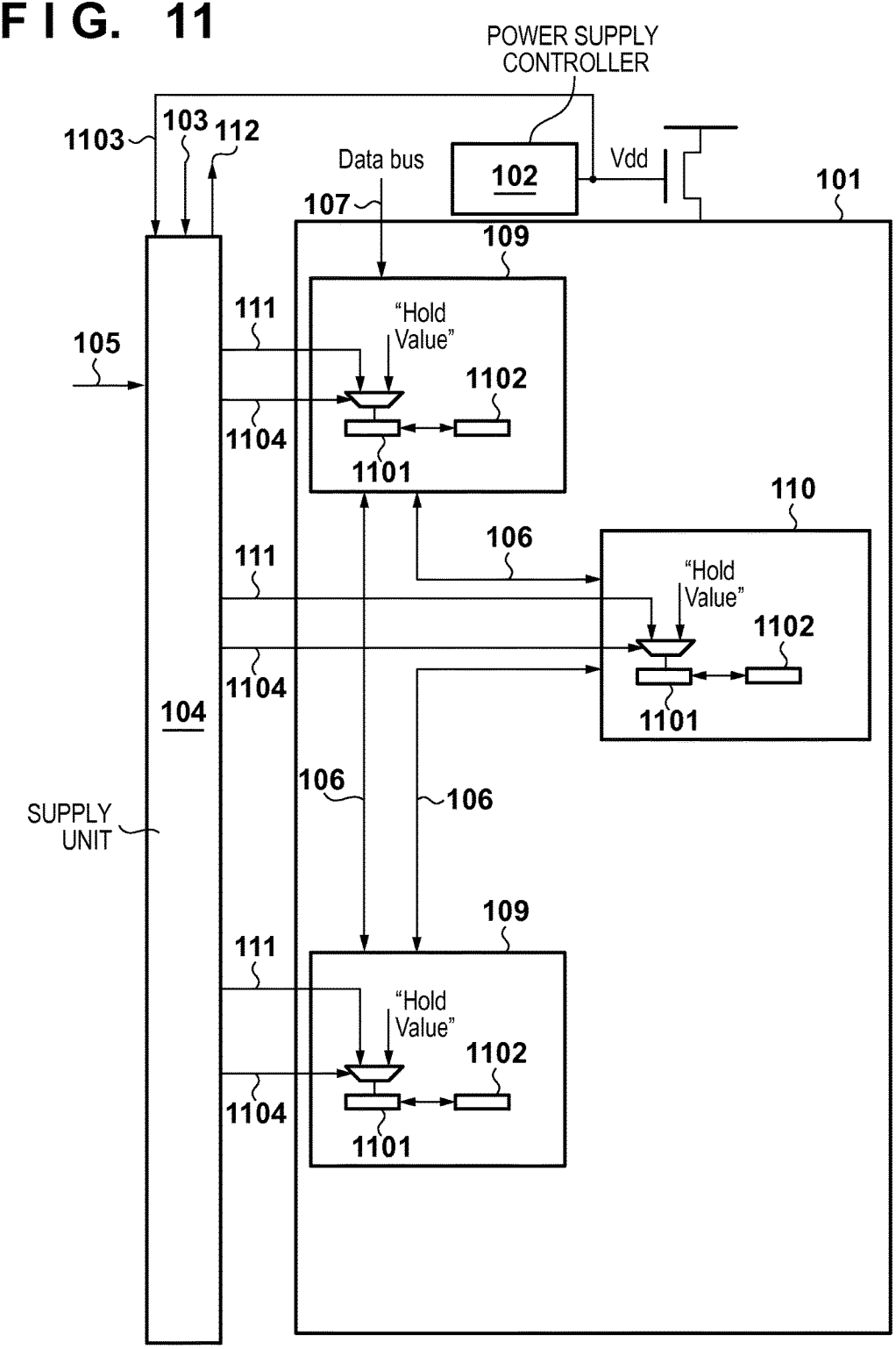
FIG. 11 is a block diagram showing the internal arrangement of an array-type processing device according to the third embodiment.

FIG. 11 is a block diagram showing the internal arrangement of an array-type processing device according to the third embodiment. Each of a router 109 and PE 110 includes a register 1101 used to hold configuration information output from a supply unit 104 and a retention register 1102 corresponding to that register 1101. Note that FIG. 11 shows the routers 109 and PE 110 required to explain an operation, and the numbers of routers and PEs are not limited to those shown in FIG. 11.

When the power supply of the corresponding register 1101 transitions from an ON state to an OFF state, the retention register 1102 automatically holds a value held in the register 1101. When the power supply of the register 1101 transitions from an OFF state to an ON state, the retention register 1102 automatically writes back the held value to the register 1101. A power ON/OFF switching instruction signal 1103 is output from a power supply controller 102 to the supply unit 104, and is used to detect a power supply state of the register 1101.

A signal 1104 is used when the register 1101 latches configuration information output from the supply unit 104. The register 1101 latches a value input from a signal line 111 while the signal 1104 is asserted, and holds the value while the signal 1104 is deasserted. After the output configuration information is held by the register 1101, the supply unit 104 invalidates the configuration information which is held in itself and is output to the register 1101 to assure an area which can hold another configuration information.

<Sequence of Configuration Information Write Processing in Array-Type Processing Device>

Figure 12:
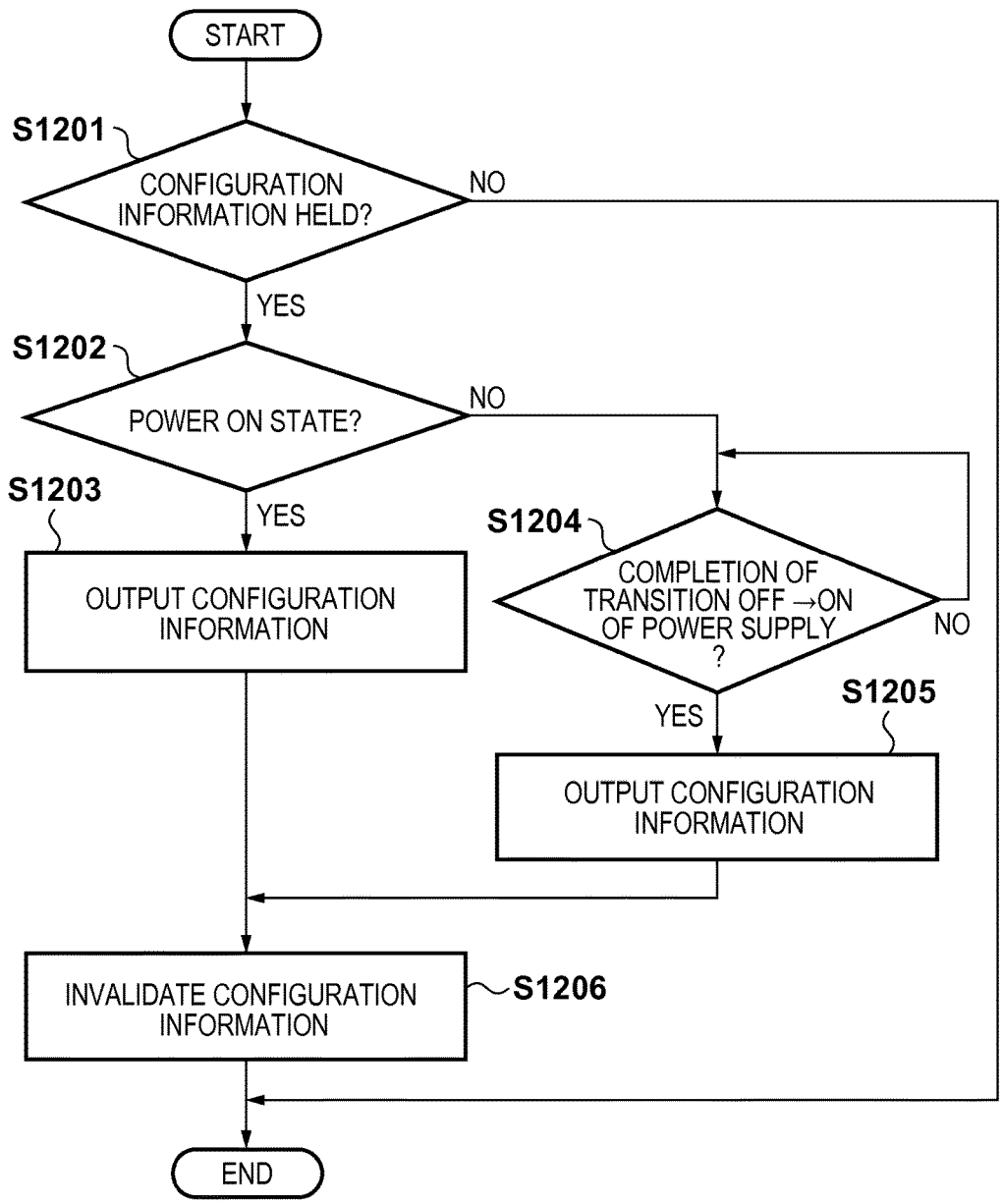
FIG. 12 is a flowchart for explaining a saving operation of configuration information in a router and PE.

FIG. 12 is a flowchart for explaining a configuration information saving operation in the router or PE. Note that the operation shown in FIG. 12 is executed when first configuration information is written in the supply unit 104 after system initialization, and when the switching instruction signal 105 is asserted.

The supply unit 104 determines in step S1201 whether or not configuration information is held. If configuration information is held, the process advances to step S1202; otherwise, the processing ends.

The supply unit 104 determines in step S1202 with reference to the power ON/OFF switching instruction signal 1103 whether or not the power supply of a PSO domain 101 is in an ON state. If the supply unit 104 determines that the power supply is in an ON state, the process advances to step S1203; otherwise, the process advances to step S1204.

In step S1203, the supply unit 104 outputs configuration information to the routers 109 and PE 110 in the PSO domain 101. More specifically, the supply unit 104 outputs configuration information via the signal lines 111, and asserts the signal 1104. When the signal lines 111 includes multi-cycle paths, the signal 1104 is asserted during a clock cycle period required for data arrival.

The supply unit 104 determines in step S1204 whether or not transition of the power supply of the PSO domain from an OFF state to an ON state is complete. If transition to an ON state is complete, the process advances to step S1205; otherwise, the control waits until transition is complete. Note that completion of transition of the power supply from an OFF state to an ON state can be detected by determining, using, for example, a differential circuit or the like, whether the power ON/OFF switching instruction signal 1103 is switched to High or Low.

In step S1205, the supply unit 104 outputs configuration information to the routers 109 and PE 110 in the PSO domain 101. More specifically, the supply unit 104 outputs configuration information via the signal lines 111 and asserts the signal 1104. The signal 1104 is asserted during a period until the power supply of the PSO domain 101 is stabilized, and the register 1101 is ready to latch the configuration information.

In step S1206, the supply unit 104 deasserts the signal 1104, and invalidates the configuration information which is output via the signal lines 111 and is held in itself.

As described above, since each of the router and PE includes the retention register used to hold configuration information, the set configuration information can be saved in the retention register during a power shut off period to the router and PE. Thus, when power supply is resumed, configuration information can be written back from the retention register to the router and PE, thus further speeding up the processing after the power supply is resumed.

Note that the third embodiment uses the retention register to hold and write back configuration information. Alternatively, configuration information may be saved in a domain in which the power supply is always in an ON state, and may be written back after the power supply is resumed. The above embodiments have explained the array-type processing device, and the present invention is applicable to any other processing devices as long as they can provide a connection environment between a plurality of processing elements when setting data are set in the plurality of connection elements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-028344, filed Feb. 15, 2013 which is hereby incorporated by reference herein in its entirety.

What is claimed is:

1. An array-type processing device, which includes a first domain, to which a power supply is controllable, and a second domain to which a power supply is always supplied, the device comprising:
   a plurality of processing units which are allocated in the first domain, each of which includes a plurality of processing elements and one or more routers configured to control connections between the plurality of processing elements;
   a power supply controller configured to control the power supply to the plurality of processing units, the power supply controller being allocated in the second domain;
   a plurality of non-transitory computer-readable storage devices; and
   a plurality of computer processing devices, which are allocated in the second domain, each connected to one or more of the plurality of non-transitory computer-readable storage devices and configured by one or more programs stored in the one or more of the plurality of non-transitory computer-readable storage devices at least to:
   externally receive a plurality of configuration information and to store the plurality of configuration information in one or more of the plurality of non-transitory computer-readable storage devices;
   select first configuration information from the received plurality of configuration information stored in the one or more of the plurality of non-transitory computer-readable storage devices; and
   supply the selected first configuration information to one or more processing units of the plurality of processing units which use the first configuration information,
   wherein, in a case where processing in the array-type processing device is switched from processing using the first configuration information to processing using second configuration information that is predefined to be selected after the first configuration information:
      the plurality of computer processing devices are configured by one or more programs stored in one or more of the plurality of non-transitory computer-readable storage devices to externally receive and store the second configuration information in one or more of the plurality of non-transitory computer-readable storage devices before completion of the processing using the first configuration information;
      the power supply controller is configured to control the power supply to the plurality of processing units so as to stably supply the power supply to one or more processing units, which use the second configuration information, before completion of the processing using the first configuration information; and
      the plurality of computer processing devices are configured by the one or more programs stored in one or more of the plurality of non-transitory computer-readable storage devices to select the second configuration information and supply the selected second configuration information to one or more processing units of the plurality of processing units which use the second configuration information, in response to completion of the processing using the first configuration information.

2. The device according to claim 1, wherein the power supply controller is configured to control the power supply to one or more processing units which are used in the processing using the first configuration information and are not used in the processing using the second configuration information in response to completion of the processing using the first configuration information.

3. The device according to claim 2, wherein each one of the plurality of computer processing devices is configured to supply configuration information to one processing unit of the plurality of processing units.

4. The device according to claim 1, wherein the power supply controller is configured to control the power supply by controlling a power supply voltage or a power supply/shut off.

5. The device according to claim 1, wherein the plurality of non-transitory computer-readable storage devices includes a plurality of shift registers to store the received configuration information.

6. The device according to claim 1, wherein each processing unit of the plurality of processing units includes one or more saving units configured to store configuration information while the power supply to one or more of the processing units is shut off.

7. The device according to claim 6, wherein each saving unit includes a retention register.

8. The device according to claim 1, wherein a first combination of one or more processing units of the plurality of processing units, which use the first configuration information for processing, and a second combination of one or more processing units of the plurality of processing units, which use the second configuration information for processing, are different.

9. The device according to claim 8, wherein the power supply controller is configured to compare the first combination and the second combination, and to specify the one or more processing units, which are to be controlled to transition from the power shut off state to the stable supply of power state, from the second combination before completion of the processing using the first configuration information.

10. A processing device comprising:
   a plurality of processing elements to which processes according to setting data are configured to be assigned;
   a plurality of connection elements configured to provide a connection environment, according to the setting data, to the plurality of processing elements, wherein the plurality of processing elements and the plurality of connection elements are allocated to a plurality of processing units, each processing unit including two or more processing elements of the plurality of processing elements and one or more connection elements of the plurality of connection elements;
   a controller configured to control a power supply voltage to be supplied to each processing unit of the plurality of processing units;
   a plurality of non-transitory computer-readable storage devices; and
   a plurality of computer processing devices each connected to one or more of the plurality of non-transitory computer-readable storage devices and configured by one or more programs stored in the one or more of the plurality of non-transitory computer-readable storage devices at least to:
      detect completion of processing according to first setting data in the plurality of processing elements;
      supply second setting data to the processing elements and one or more connection elements of the plurality of connection elements in response to the detection, the second setting data being predefined to be selected after the first setting data; and cause the controller to transition one or more processing units, which are to perform processing according to the second setting data, of the plurality of processing units, from a power shut off state to a stable supply of power state before detecting the completion of processing according to the first setting data.

11. The device according to claim 10, wherein the controller is configured to execute shut off control or supply control of the power supply voltage to be supplied to each processing unit of the plurality of processing units.

12. The device according to claim 10, wherein each processing unit of the plurality of processing units includes a saving unit configured to save the first setting data while the power supply from the controller is shut off.

13. The device according to claim 12, wherein each saving unit includes a retention register.

14. The device according to claim 10, wherein one or more computer processing devices of the plurality of computer processing devices are configured to:

externally receive and store the second setting data before completion of the processing using the first setting data, the second setting data being stored in one or more of the plurality of non-transitory computer-readable storage devices;

detect completion of processing according to the first setting data; and change a supply time period of the second setting data in response to the detected completion of processing according to the first setting data.

15. An information processing system comprising:

an array-type processing device which includes a first domain, to which a power supply is controllable, and a second domain to which a power supply is always supplied, the device comprising:

a plurality of processing units which are allocated in the first domain, each of which includes a plurality of processing elements and one or more routers configured to control connections between the plurality of processing elements;

a power supply controller configured to control the power supply to the plurality of processing units, the power supply controller being allocated in the second domain;

a plurality of non-transitory computer-readable storage devices; and a plurality of computer processing devices, which are allocated in the second domain, each connected to one or more of the plurality of non-transitory computer-readable storage devices and configured by one or more programs stored in the one or more of the plurality of non-transitory computer-readable storage devices at least to:

externally receive a plurality of configuration information and to store the plurality of configuration information in one or more of the plurality of non-transitory computer-readable storage devices;

select first configuration information from the received plurality of configuration information stored in the one or more of the plurality of non-transitory computer-readable storage devices; and supply the selected first configuration information to one or more processing units of the plurality of processing units which use the first configuration information, wherein, in a case where processing in the array-type processing device is switched from processing using the first configuration information to processing using second configuration information that is predefined to be selected after the first configuration information:

the plurality of computer processing devices is configured by one or more programs stored in one or more of the plurality of non-transitory computer-readable storage devices to externally receive and store the second configuration information in one or more of the plurality of non-transitory computer-readable storage devices before completion of the processing using the first configuration information;

the power supply controller is configured to control the power supply to transition one or more processing units, which use the second configuration information, of the plurality of processing units, from a power shut off state to a stable supply of power state before completion of the processing using the first configuration information; and the plurality of computer processing devices is configured by one or more programs stored in one or more of the plurality of non-transitory computer-readable storage devices to detect an execution state of processing using the first configuration information and transmit a signal to select the second configuration information and supply the selected second configuration information to one or more processing units of the plurality of processing units which use the second configuration information, in response to completion of the processing using the first configuration information.

16. A control method of an array-type processing device, which includes a first domain, to which a power supply is controllable, and a second domain to which a power supply is always supplied, the array-type processing device comprising:

a plurality of processing units which are allocated in the first domain, each of which includes a plurality of processing elements and one or more routers configured to control connections between the plurality of processing elements;

a power supply controller configured to control the power supply to the plurality of processing units, the power supply controller being allocated in the second domain;

a plurality of non-transitory computer-readable storage devices; and a plurality of computer processing devices, which are allocated in the second domain, each connected to one or more of the plurality of non-transitory computer-readable storage devices and configured by one or more programs stored in the one or more of the plurality of non-transitory computer-readable storage devices at least to:

externally receive a plurality of configuration information and to store the plurality of configuration information in one or more of the plurality of non-transitory computer-readable storage devices;

select one configuration information from the received plurality of configuration information stored in the one or more of the plurality of non-transitory computer-readable storage devices; and supply the selected first configuration information to one or more processing units of the plurality of processing units which use the first configuration information, wherein, in a case where processing in the array-type processing device is switched from processing using the first configuration information to processing using second configuration information that is predefined to be selected after the first configuration information, the control method comprises:

controlling one or more non-transitory storage devices of the plurality of non-transitory storage devices to externally receive and store the second configuration information before completion of the processing using the first configuration information;

controlling the power supply controller to control the power supply to transition one or more processing units, which use the second configuration information, of the plurality of processing units, from a power shut off state to a stable supply of power state before completion of the processing using the first configuration information; and selecting the second configuration information and supplying the selected second configuration information to one or more processing units of the plurality of processing units which use the second configuration information, in response to completion of the processing using the first configuration information.

\* \* \* \* \*